US007659911B2

(12) United States Patent
Wittenstein

(10) Patent No.: US 7,659,911 B2
(45) Date of Patent: Feb. 9, 2010

(54) METHOD AND APPARATUS FOR LOSSLESS AND MINIMAL-LOSS COLOR CONVERSION

(76) Inventor: Andreas Wittenstein, P.O. Box 570, San Geronimo, CA (US) 94963

( * ) Notice: Subject to any disclaimer, the term of this patent is extended or adjusted under 35 U.S.C. 154(b) by 191 days.

(21) Appl. No.: 11/112,274

(22) Filed: Apr. 21, 2005

(65) Prior Publication Data

US 2006/0274335 A1    Dec. 7, 2006

(51) Int. Cl.
*G09G 5/02* (2006.01)
*G03F 3/08* (2006.01)
*H04N 1/46* (2006.01)
*G06F 7/00* (2006.01)
*G06F 7/38* (2006.01)
*G06F 9/00* (2006.01)
*G09G 5/00* (2006.01)

(52) U.S. Cl. .................. 345/591; 345/589; 345/600; 345/606; 345/643; 382/162; 382/167; 382/300; 358/518; 358/525; 708/204; 708/495; 708/497; 708/501; 712/221; 712/222

(58) Field of Classification Search ......... 345/589–591, 345/597, 600, 603–604, 543, 586, 581, 606, 345/643–644, 549; 358/1.9, 3.23, 515–525; 382/162–167, 254, 274, 276, 300; 348/557, 348/560, 630–631, 661, 760; 708/204–208, 708/290, 490, 495, 497, 523, 501–505, 551, 708/620; 712/217, 223, 220–222
See application file for complete search history.

(56) References Cited

U.S. PATENT DOCUMENTS

| 6,954,214 | B2 * | 10/2005 | Wilt et al. | .................. 345/591 |
| 2002/0085015 | A1 * | 7/2002 | Wilt et al. | .................. 345/600 |
| 2003/0222998 | A1 * | 12/2003 | Yamauchi et al. | ........... 348/262 |
| 2004/0201593 | A1 * | 10/2004 | Nishimura et al. | .......... 345/591 |
| 2005/0168487 | A1 * | 8/2005 | Wilt et al. | .................. 345/643 |

* cited by examiner

*Primary Examiner*—Wesner Sajous
(74) *Attorney, Agent, or Firm*—Philip H. Albert; Townsend and Townsend and Crew LLP

(57) ABSTRACT

A method and apparatus for perfectly lossless and minimal-loss interconversion of digital color data between spectral color spaces (RGB) and perceptually based luma-chroma color spaces ($Y'C_BC_R$) is disclosed. In particular, the present invention provides a process for converting digital pixels from R'G'B' space to $Y'C_BC_R$ space and back, or from $Y'C_BC_R$ space to R'G'B' space and back, with zero error, or, in constant-precision implementations, with guaranteed minimal error. This invention permits digital video editing and image editing systems to repeatedly interconvert between color spaces without accumulating errors. In image codecs, this invention can improve the quality of lossy image compressors independently of their core algorithms, and enables lossless image compressors to operate in a different color space than the source data without thereby becoming lossy. The present invention uses fixed-point arithmetic with signed and unsigned rounding normalization at key points in the process to maintain reversibility.

6 Claims, 14 Drawing Sheets

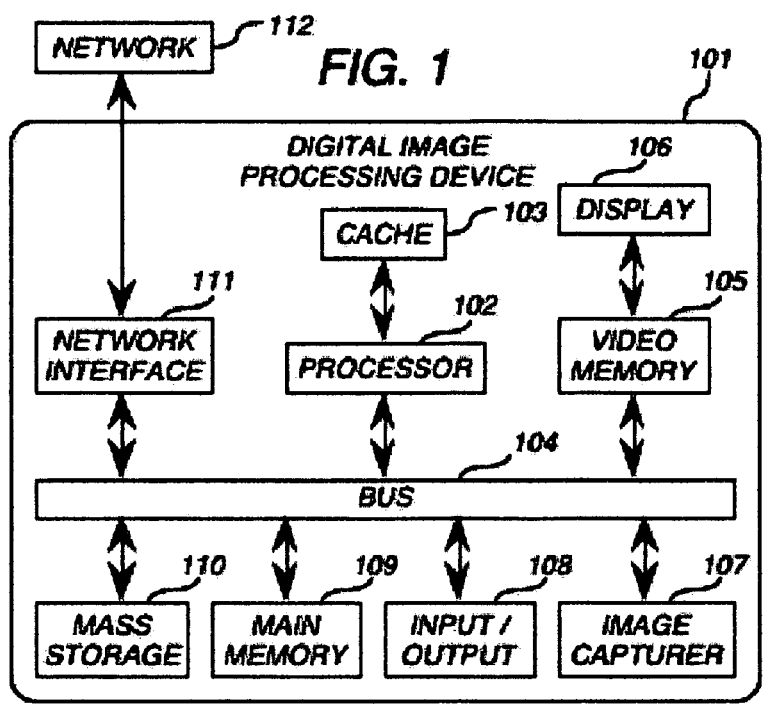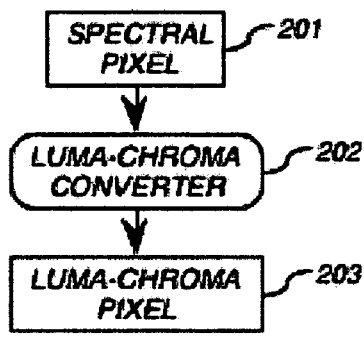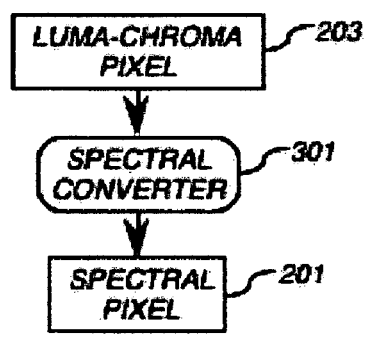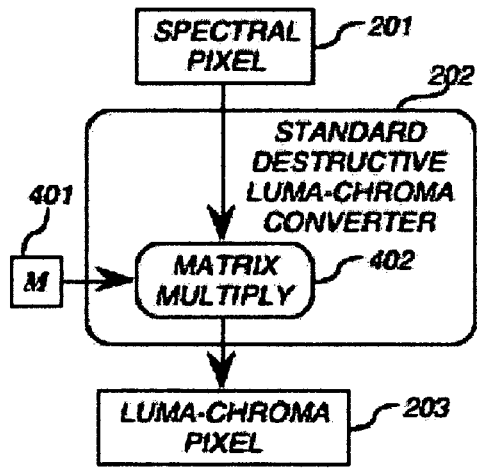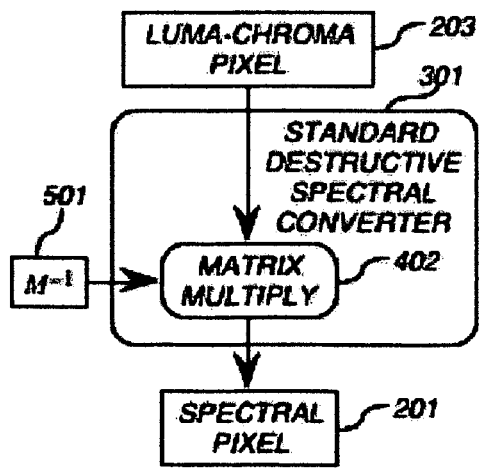

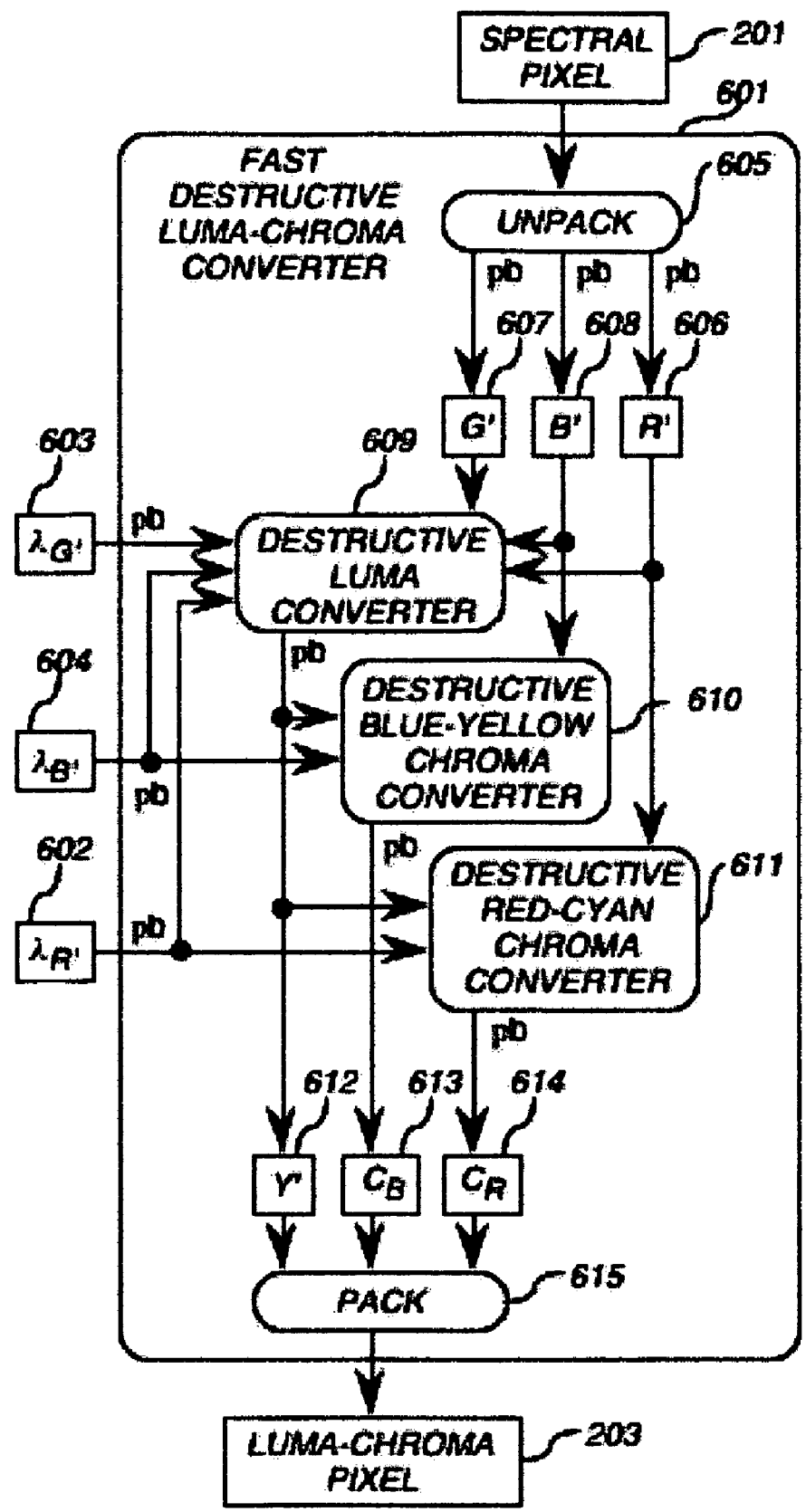

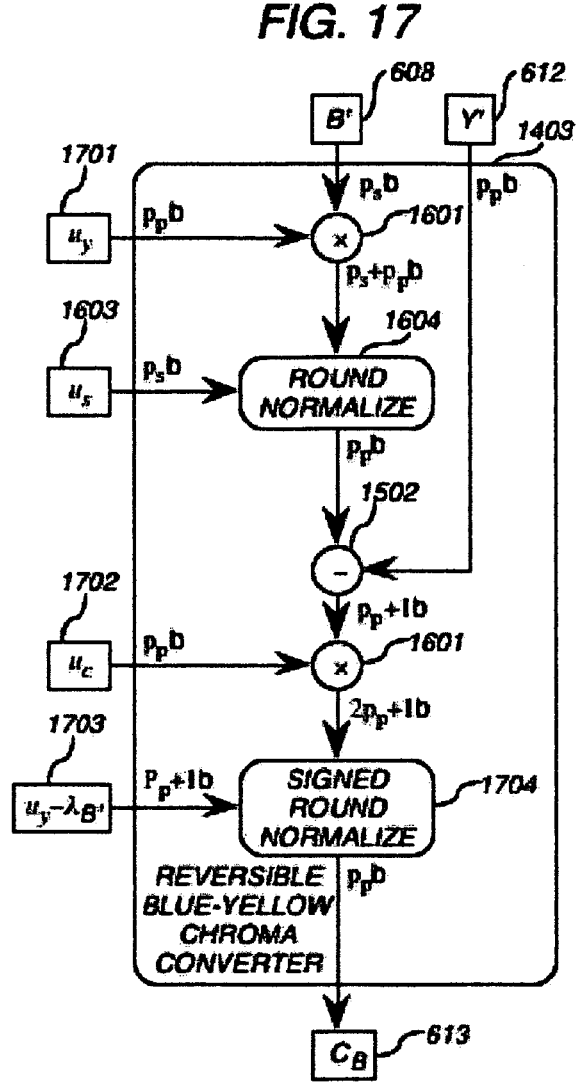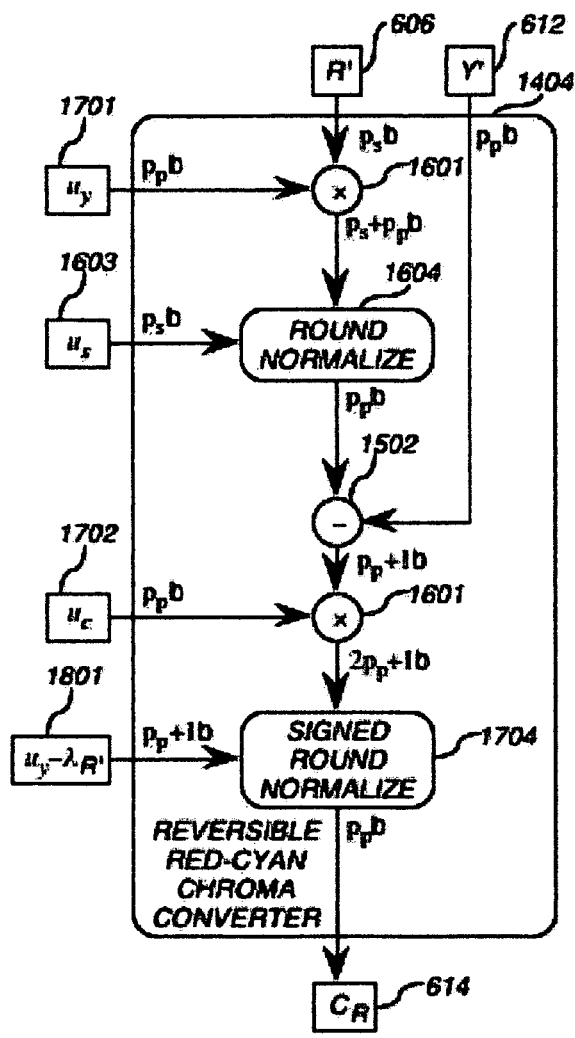

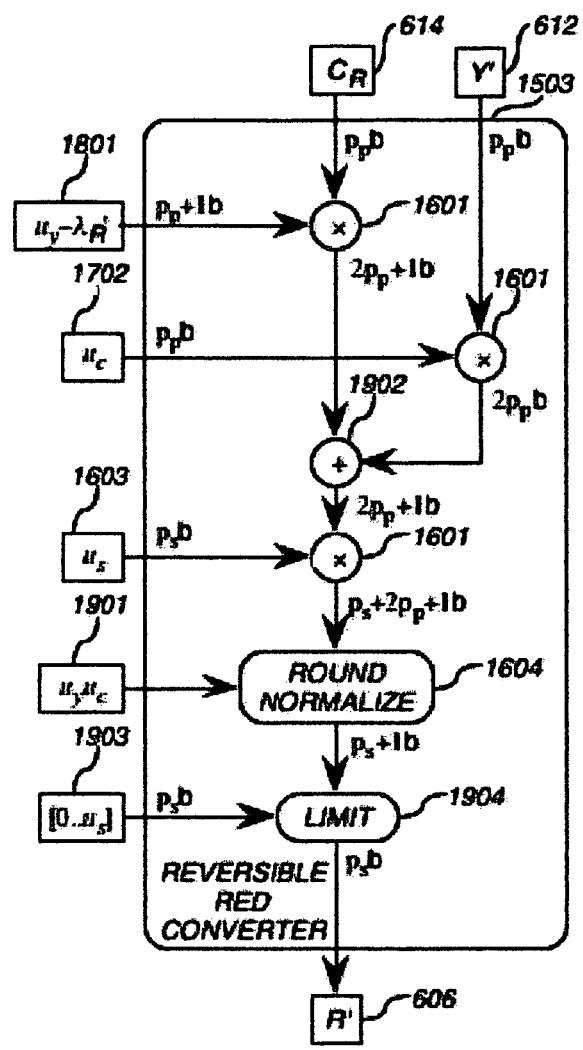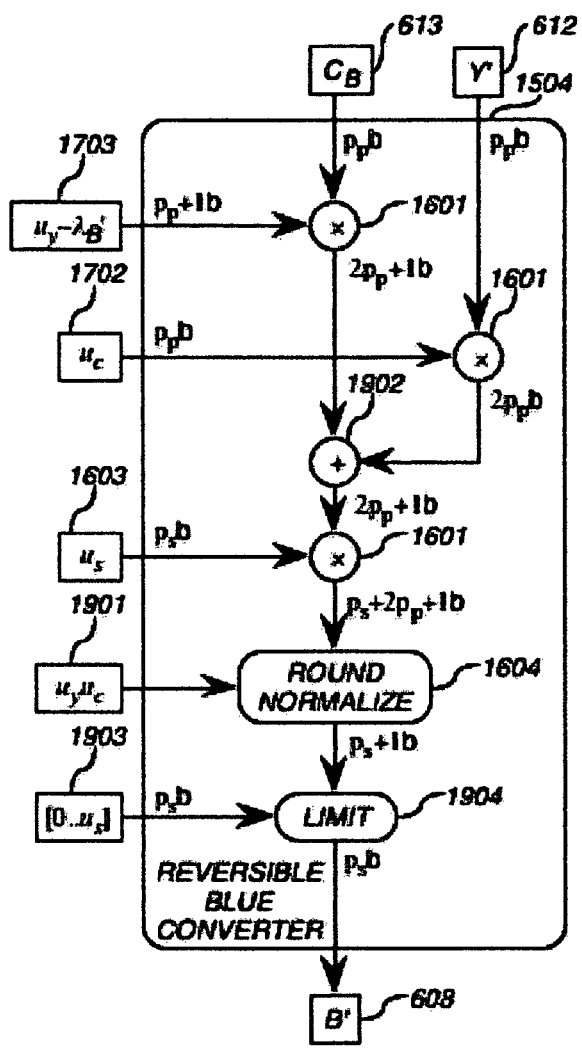
FIG. 19
FIG. 20

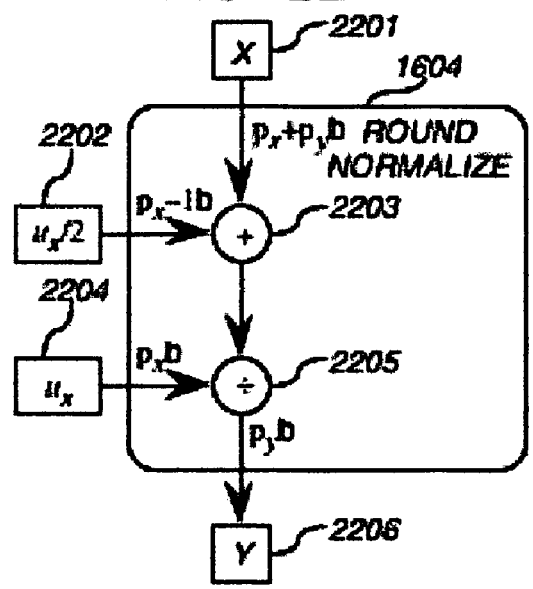
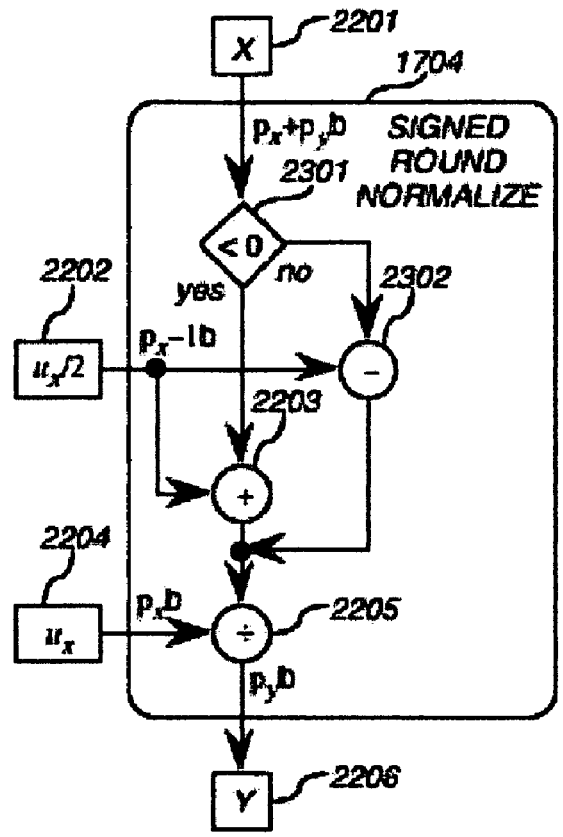
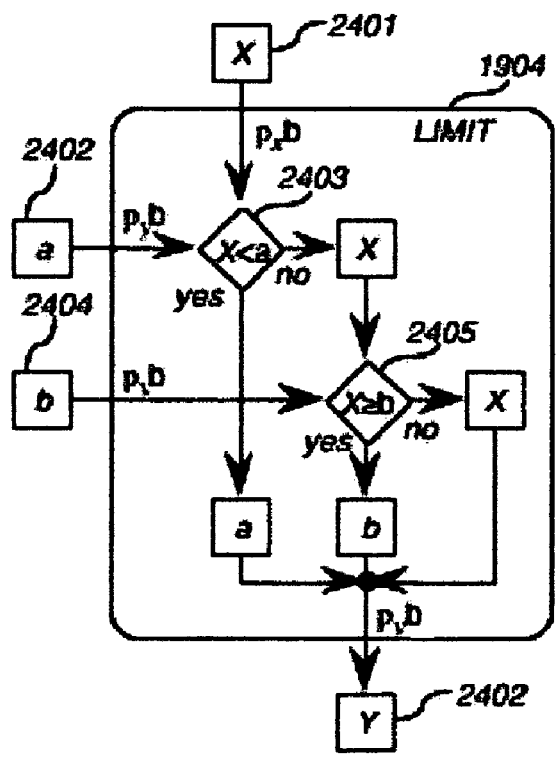

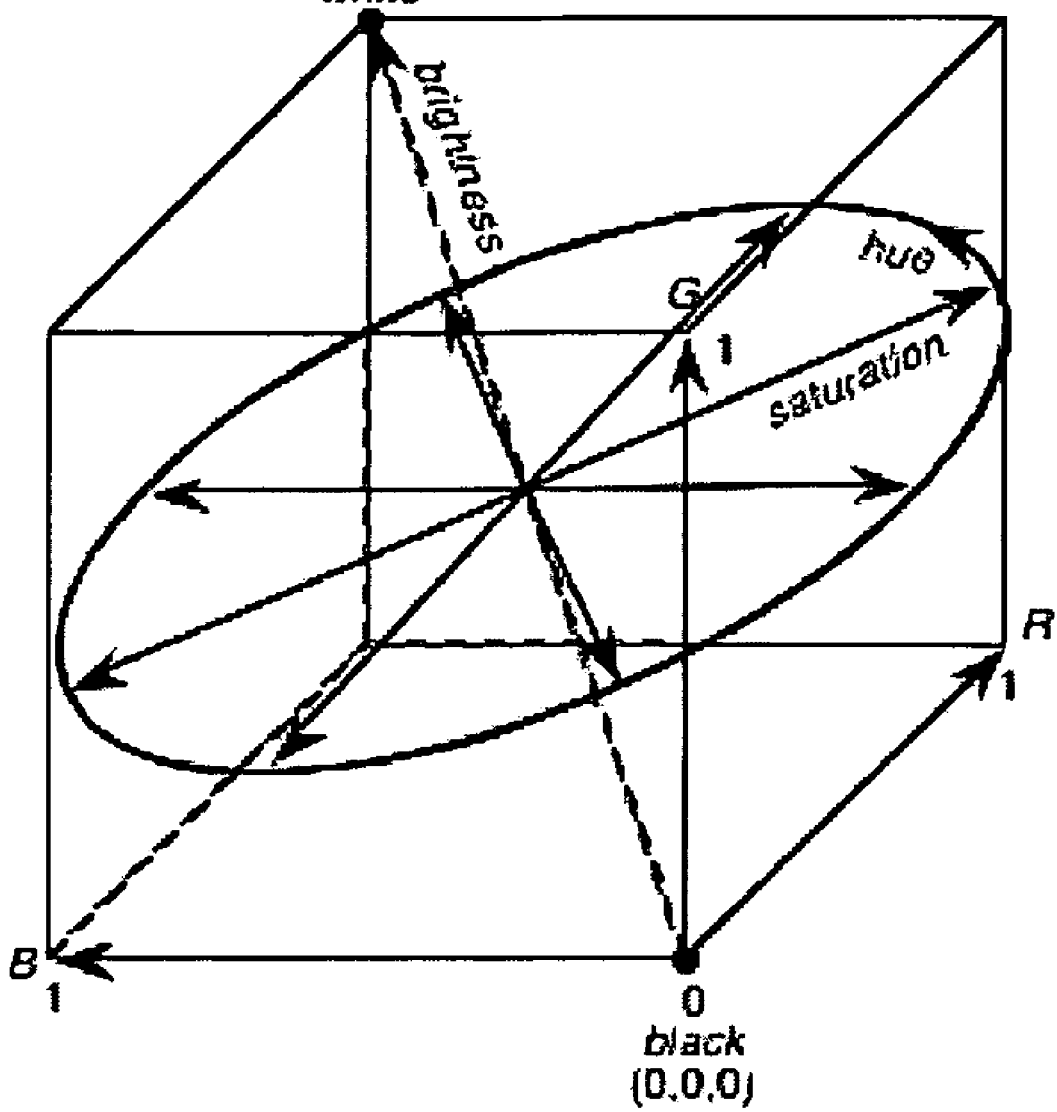

US 7,659,911 B2

METHOD AND APPARATUS FOR LOSSLESS AND MINIMAL-LOSS COLOR CONVERSION

CROSS-REFERENCE TO RELATED INVENTION

This invention claims priority to Provisional Patent Application Ser. No. 60/564,136, entitled "Method and Apparatus For Faster-Than-Real-Time-Lossless Compression and Decompression of Images", filed on Nov. 4, 2005.

LITERATURE CITED

David Izraelevitz and Joshua L. Koslov, "Code Utilization for Component-coded Digital Video," in Tomorrow's Television, Proceedings of 16th Annual SMPTE Television Conference, Scarsdale, N.Y., SMPTE, 1982, pp. 22-30.
ITU-R Recommendation BT.601-5, Studio encoding parameters of digital television for standard 4:3 and wide-screen 16:9 aspect ratios, 1995.
ITU-R Recommendation BT.601-4
ITU-R Recommendation BT.470-4
IUT-R Recommendation BT.709-2
SMPTE 170M-1994
SMPTE 240M-1995
SMPTE 274M-1995
SMPTE 293M-1996
SMPTE 296M-1997

BACKGROUND OF THE INVENTION

1. Field of the Invention

This invention relates to the field of image and video processing, in particular to capture, compression, storage, transmission, editing, decompression, and display of digital images and video.

2. Background Art 2.1. RGB Space

At the point of display, digital color images, whether originally from computer-generated imagery (CGI), digital video, redigitized analog video, digital photography, or digitized film, consist of a rectangular array of picture elements (pixels), each pixel whereof superposes three spectral primary color intensity components—nominally red, green, and blue (RGB)—, each of which components is quantized to a fixed precision. In standard high-quality displays, the precision is almost always 8 bits per component, which is nearly enough to represent all perceptibly distinct tones within the RGB gamut of most color display technologies, such as the cathode ray tube, liquid crystal display, and plasma display. These R, G, and B stimulus values are mapped within the display by a nonlinear transfer function from gamma-corrected intensity components R', G', and B' stored in display memory. Thus the set of possible pixel values spans a finite discrete three-dimensional color-intensity space, R'G'B' space. Colors outside this finite gamut cannot be displayed, and colors representing finer spectral or tonal distinctions than this discrete gamut cannot be distinguished.

At the point of capture, too, color video and film images are represented in a spectral color space, most often {red, green, blue} or its complement, {cyan, magenta, yellow} (CMY), whether the images are retained in this form or converted to a different color space for analog video. These spectral stimulus values are mapped within the camera by a nonlinear transfer function to gamma-corrected intensity components R', G', and B'. In specialized cases, some or all of the captured spectral components may represent infrared or ultraviolet frequencies outside the RGB range. Other specialized cases, termed multispectral or hyperspectral, include more than three spectral components. But all of these are ultimately rendered to RGB space for display.

The reason for this ubiquitous RGB representation in image capture and especially display is its correspondence to human perception. The human retina contains three types of cone-shaped light receptors, sensitive to three different broadly overlapping regions of the light spectrum, nominally red (R), green (G), and blue (B). Because the cones in a human retina contain only three different photoreceptive pigments, it is possible, by mixing just three primary colors, one in each of these spectral regions, to produce most colors distinguishable by humans—or even, if negative proportions are allowed, all humanly distinguishable colors. This parsimonious representability in terms of three primary colors is very important for minimizing bandwidth and storage capacity requirements.

During editing, the R'G'B' images are sometimes represented at higher precision, often 10 or 16 bits per component, to minimize accumulation of error. And often images are captured at 10 or more bits per component to leave enough play for changing lighting conditions. Some high-end systems are even capable of displaying the R'G'B' images at a precision of 10 or more bits per channel.

2.2. $Y'C_BC_R$ Space

Despite the fact that color images are universally captured and displayed in a spectral color space, nonspectral color spaces known as luma-chroma ($Y'C_BC_R$) or luminance-chrominance spaces are often used for storage and transmission—particularly for television broadcast and recording, but also for still photography, computer-generated imagery, and digitized film. The luma or Luminance dimension (r) represents brightness, while the chroma dimensions ($C_B$ and $C_R$) together represent hue and saturation. The polar topology of hue and saturation, however, renders these dimensions unsuitable for hardware and software implementations. In R'G'B' space, hue corresponds to the angle about the gray (R'=G'=B') line, while saturation corresponds to the distance from the gray line (FIG. 25). Thus chroma is represented instead by a pair of arbitrary Cartesian dimensions, ideally perpendicular to the gray line. These Cartesian dimensions, generally red...cyan ($C_R$) and blue...yellow ($C_R$), represent quite unintuitive opponent-color gamuts that range from a spectral hue through gray to the corresponding antihue, or complementary color. In a digital representation, each of the luma and chroma components is represented at each pixel to a finite precision, typically 8 or 10 bits, although the chroma components are often spatially sampled at a lower rate than luma.

The justification for storage and transmission of images in luma-chroma space is again the correspondence to human perception. The sensitivity of the human visual system to differences in intensity is highly nonuniform among different colors. The unequal sensitivity of the red, green, and blue cone types perceptually distorts the R'G'B' space. Green cones are about twice as sensitive to brightness as red cones, and red cones are about three times as sensitive as blue cones. Because of the differential sensitivity of the different cone pigments, blue intensity can be quantized three times as coarsely as red, and red intensity can in turn be quantized twice as coarsely as green, with little perceptible effect; in analog terms, the blue component can be assigned a third the bandwidth of the red component, which in turn needs only half the bandwidth of the green component. Furthermore, the human retina also contains rod-shaped photoreceptors, in even greater number than cones, which do not distinguish color, but are more sensitive to brightness. Because of this discrepancy in spatial and intensity resolution, the chroma of an image can be quantized more coarsely than the luma, or assigned a smaller bandwidth than the luma, with little perceptible effect. Again, the economy of the $Y'C_BC_R$ representation is very important for the potential savings in bandwidth and storage capacity.

Historically, the green>red>blue bias of the human brightness percept is reflected in the sepia bias of monochrome video and photography. Similarly, the luma>chroma bias is reflected in the mere fact that monochrome photography and videography preceded color versions of those technologies, as well as in the relatively small bandwidth allocated to chroma relative to luma in storage and transmission formats. The digital $Y'C_BC_R$ luma-chroma spaces are modelled after and designed for ease of interchange with the color spaces used in international color television standards, such as Y'IQ of the North-American color-television standard NTSC, and Y'UV of the European color-television standards PAL and SECAM. The digital $Y'C_BC_R$ spaces differ from these analog spaces chiefly in that, for ease of computation, the chroma axes ($C_B$ and $C_R$) are not quite perpendicular to the luma axis (Y').

The $Y'C_BC_R$ representation is used today in most popular digital color image formats, including the lossy still-image compression standards JPEG-DCT and PhotoYCC, and the current lossy moving-image compression standards D-5, D-1, Digital Betacam, DV, Motion-JPEG, Photo JPEG, MPEG-2, H.263, and H.264. Most lossy color-image compressors take advantage of the greater perceptual relevance of $Y'C_BC_R$ space, converting the spectral pixel values to a perceptually more-uniform space at the beginning of the compression phase (FIG. 2), performing the bulk of the computation in the perceptual space, and converting the pixels back to display-color space at the end of the decompression phase (FIG. 3). When operating on the image in a perceptually uniform space, a uniform computational error range or quantization error range guarantees that the peak perceptual error is no greater than the average perceptual error, making it possible to quantize the image much more coarsely (and hence compress it further) for a given image quality. JPEG-DCT was internationally adopted in 1994 as part of ISO/IEC DIS 10918-1. The most popular standard relating R'G'B' to $Y'C_BC_R$ is given in Recommendation ITU-R BT.601, adopted in 1990.

Until recently, top-quality $Y'C_BC_R$ recordings used 10-bit channels, as in the D-5 tape format, in order to achieve the same tonal precision as 8-bit RGB channels. Now some cameras provide even higher precision in order to leave enough play for varying lighting conditions.

2.3. Color-Space Conversion

Because color images are initially captured and ultimately displayed in RGB space but often stored and transmitted in $Y'C_BC_R$ space, the preservation of image quality demands that as little information as possible be lost in the interconversions between these two color spaces. The advent of digital video editing systems reinforces this motive, since many digital editing effects are most conveniently applied or only available at all in R'G'B' space, necessitating multiple conversions back and forth between the two color spaces, and thus entailing further information loss and image degradation on each successive editing generation. In the trade literature, the interconversion between digital R'G'B' and $Y'C_BC_R$ representations is assumed to be inherently lossy [Izraelevitz & Koslov 1982]. Moreover, in actual implementation in prior art, despite the care often taken to reduce the information loss, these interconversions are indeed always lossy. As a result, in both the conversion from display-color space to perceptual space and the reverse, information is lost and the image quality is degraded.

The conversion from an R'G'B' pixel value to a luma value (Y') shrinks the red and especially the blue components relative to the green component.

$$Y' \leftarrow \lambda_R \times R' + \lambda_G \times G' + \lambda_B \times B'$$

The ideal scaling factors ($\lambda_R, \lambda_G, \lambda_B$) depend on the specific RGB primaries used, and several standards are in currency. In Composite NTSC (SMPTE 170M-1994), Composite PAL (ITU-R BT.470-4 System B), 720×483 progressive 16:9 (SMPTE 293M-1996), Digital 525 (SMPTE 125M-1995 (4:3 parallel), SMPTE 259M-1997 (serial), and SMPTE 267M-1995 (16:9 parallel)), and Digital 625 (ITU-R BT.470-4 System G), the luma coefficients are defined as:

$$\lambda_R = 0.298912 = \sim 0.299$$

$$\lambda_G = 0.586611 = \sim 0.587$$

$$\lambda_B = 0.114478 = \sim 0.114$$

In practice, these coefficients are generally rounded to three decimal places. This set of luma coefficients is also standardized in ITU-R BT.601-4 and used in standard digital video tape formats including SMPTE D-1 and SMPTE D-5, standard digital video links such as Serial Digital Interface (SMPFE 259M-1997), and most digital image compression schemes, including DV, WPEG, MPEG-2, H.263, and most other digital color-image compression schemes.

In 1920×1035 HDTV (SMPTE 240M-1995 and SMPTE 260M-1992) and the 1920×1080 HDTV interim color implementation (SMPTE 274M-1995), the luma coefficients are defined as:

$$\lambda_R = 0.212$$

$$\lambda_G = 0.701$$

$$\lambda_B = 0.087$$

And in 1920×1080 HDTV (SMPTE 274M-1995), 1280×720 HDTV (SMPTE 296M-1997), and 1125 60/2:1 (ITU-R BT.709-2), the luma coefficients are defined to be:

$$\lambda_R = 0.2126$$

$$\lambda_G = 0.7152$$

$$\lambda_B = 0.0722$$

In any case, the luma coefficients are defined to sum to unity, giving luma a nominal range of [0 . . . 1], just as for the R'G'B' components. Frequently, however, luma is defined to have headroom and footroom for superwhite and subblack, as described below.

The chroma dimensions in all these standards are a blue . . . yellow opponent ($C_B$), and a red . . . cyan opponent ($C_R$), which are defined in terms of the luma dimension as:

$$C_B \leftarrow (B' - Y')/(2 - 2 \times \lambda_B)$$

$$C_R \leftarrow (R' - Y')/(2 - 2 \times \lambda_R)$$

The chroma dimensions are scaled to have a range of [−½ . . . ½], again usually leaving some headroom and footroom for filter overshoot and undershoot.

In practice, the chroma functions are generally expanded and combined with the luma function to yield a simple matrix multiplication M×R'G'B'→$Y'C_BC_R$ (FIG. 4). This form is especially simple to implement and efficient for vector processors. For Rec. 601, for example:

$$Y' \leftarrow 0.299 \times R' + 0.587 \times G' + 0.114 \times B'$$

$$C_B \leftarrow -0.169 \times R' - 0.331 \times G' + 0.500 \times B'$$

$$C_R \leftarrow 0.500 \times R' - 0.418 \times G' - 0.082 \times B'$$

The inverse conversion from $Y'C_BC_R$ to R'G'B' is given by inverting this matrix, $M^{-1} \times Y'C_BC_R \rightarrow R'G'B'$ (FIG. 5). Again, for Rec. 601:

$$R' \leftarrow 1.000 \times Y' + 0.000 \times C_B + 1.402 \times C_R$$

$$G' \leftarrow 1.000 \times Y' - 0.346 \times C_B - 0.714 \times C_R$$

$$B' \leftarrow 1.000 \times Y' + 1.771 \times C_B + 0.000 \times C_R$$

For speed-conscious implementations on sequential processors, it is possible factor out redundant steps and eliminate the multiplications by one and zero. Thus the forward conversion can be reduced from 9 multiplications and 6 additions to 5 multiplications and 4 additions; and the inverse conversion is reduced to 4 multiplications and 4 additions.

$$Y' \leftarrow 0.299 \times R' + 0.587 \times G' + 0.114 \times B'$$

$$C_B \leftarrow 0.564 \times (B' - Y')$$

$$C_R \leftarrow 0.564 \times (R' - Y')$$

$$R' \leftarrow Y' + 1.402 \times C_R$$

$$G' \leftarrow Y' - 0.346 \times C_B - 0.714 \times C_R$$

$$B' \leftarrow Y' + 1.771 \times C_B$$

Since the $Y'C_BC_R$ pixels are represented in fixed point, generally to the same precision as the RGB pixels, the most frugal implementations carry out the entire luma-chroma conversion (FIG. 6) and spectral conversion (FIG. 7) in fixed point, to avoid conversions to and from floating-point representation. In a fixed-point implementation, the luma conversion can be reduced to 3 multiplications, 2 additions, and 1 normalization (FIG. 8), and the blue . . . yellow and red . . . cyan chroma conversions can be reduced to 1 multiplication, 1 subtraction, and 1 normalization each (FIG. 9, 10). In the inverse direction, in a fixed-point spectral conversion, the red and blue conversions can be reduced to 1 multiplication, 1 addition, and 1 normalization each (FIG. 11, 12), and the green conversion can be reduced to 2 multiplications, 1 addition and 1 subtraction, and 1 normalization (FIG. 13). In a fixed-point implementation, if the unit u (803) for the multipliers (801, 903, 1102) is chosen to be a power of two or nearly so, then the normalization (804, 1104) can be implemented as a right-shift rather than a divide. Where fixed-point multiplication by a constant is slower than a table lookup, all the multiplications (801, 903, 1102) can be implemented with one-dimensional tables filled during an initialization phase.

In prior art, the luma-chroma transformation process is bidirectionally destructive. In other words, in an R'G'B'→$Y'C_BC_R$→R'G'B' workflow, information is lost both on conversion to $Y'C_BC_R$ space and again on conversion back to R'G'B' space. Similarly, in a $Y'C_BC_R$→R'G'B'→$Y'C_BC_R$ workflow, information is lost both on conversion to R'G'B' space and on conversion back to $Y'C_BC_R$ space. Considering that the inverse of a fixed-point (i.e. integer) matrix is a rational matrix, this lossiness would seem to be inevitable.

Prior implementations sometimes adjust the matrix elements to reduce the reversibility error. Even so, simple geometric analysis reveals that, at best, such efforts will still result in more than ¾ of all possible R'G'B' pixels emerging incorrect when converted to $Y'C_BC_R$ and back. Specifically, note that the R'G'B'={0,0,0} origin maps to the $Y'C_BC_R$={0, 0,0} origin; the unit red axis R'G'B'={1,0,0} maps to $Y'C_BC_R$={0.2989,−0.169,0.5}, with a length of ~0.607; the unit green axis R'G'B'={0,1,0} maps to $Y'C_BC_R$={0.5866,−0.331,−0.419}, with a length of ~0.794; and the unit blue axis R'G'B'={0,0,1} maps to $Y'C_BC_R$={0.1145,0.5,−0.081}, with a length of ~0.519. Thus if the luma-chroma transformation were isogonal, the volume of the R'G'B' cube in $Y'C_BC_R$ space would be ~0.607×~0.794×~0.519=~0.250. But since the transformation is skewed for all standard $Y'C_BC_R$ spaces, the actual volume is even smaller.

SUMMARY OF THE INVENTION

The present invention is a method and apparatus for interconverting color data between spectral display space and luma-chroma perceptual space. In particular, the present invention provides a process for converting digital pixels from R'G'B' space to $Y'C_BC_R$ space and back, or from $Y'C_BC_R$ space to R'G'B' space and back, with zero error, or, in constant-precision implementations, with guaranteed minimal error. This invention permits digital video editing and image editing systems to repeatedly interconvert between color spaces without accumulating errors. In image codecs, this invention can improve the quality of lossy image compressors independently of their core algorithms, and enables lossless image compressors to operate in a different color space than the source data without thereby becoming lossy.

BRIEF DESCRIPTION OF THE DRAWINGS

FIG. 1 is a diagram of a digital image processing device that may be used with an embodiment of the invention.

FIG. 2 is an information flow diagram of the conversion from spectral display color to perceptual luma-chroma color.

FIG. 3 is an information flow diagram of the conversion from perceptual luma-chroma color to spectral display color.

FIG. 4 is an information flow diagram of the luma-chroma color converter in FIG. 2, using a standard destructive matrix multiply.

FIG. 5 is an information flow diagram of the spectral color converter in FIG. 3, using a standard destructive matrix multiply.

FIG. 6 is an alternate flow diagram of the luma-chroma color converter in FIG. 2, using a fast destructive fixed-point converter for a sequential processor.

FIG. 17 is an information flow diagram of the reversible blue-yellow chroma converter in FIG. 14.

FIG. 18 is an information flow diagram of the reversible red-cyan chroma converter in FIG. 14.

FIG. 19 is an information flow diagram of the reversible red converter step of FIG. 15.

FIG. 20 is an information flow diagram of the reversible blue converter step of FIG. 15.

FIG. 22 is an information flow diagram of the signed rounding normalizer in FIGS. 17 and 18.

FIG. 23 is an information flow diagram of the unsigned rounding normalizer in FIGS. 16, 19, 20, and 21.

FIG. 24 is an information flow diagram of the limiter in FIGS. 19, 20, and 21.

FIG. 25 is a three-dimensional graph of the relationship between R'G'B' display space and $Y'C_B C_R$ perceptually based luma-chroma space.

DETAILED DESCRIPTION OF THE INVENTION

Figure 7:
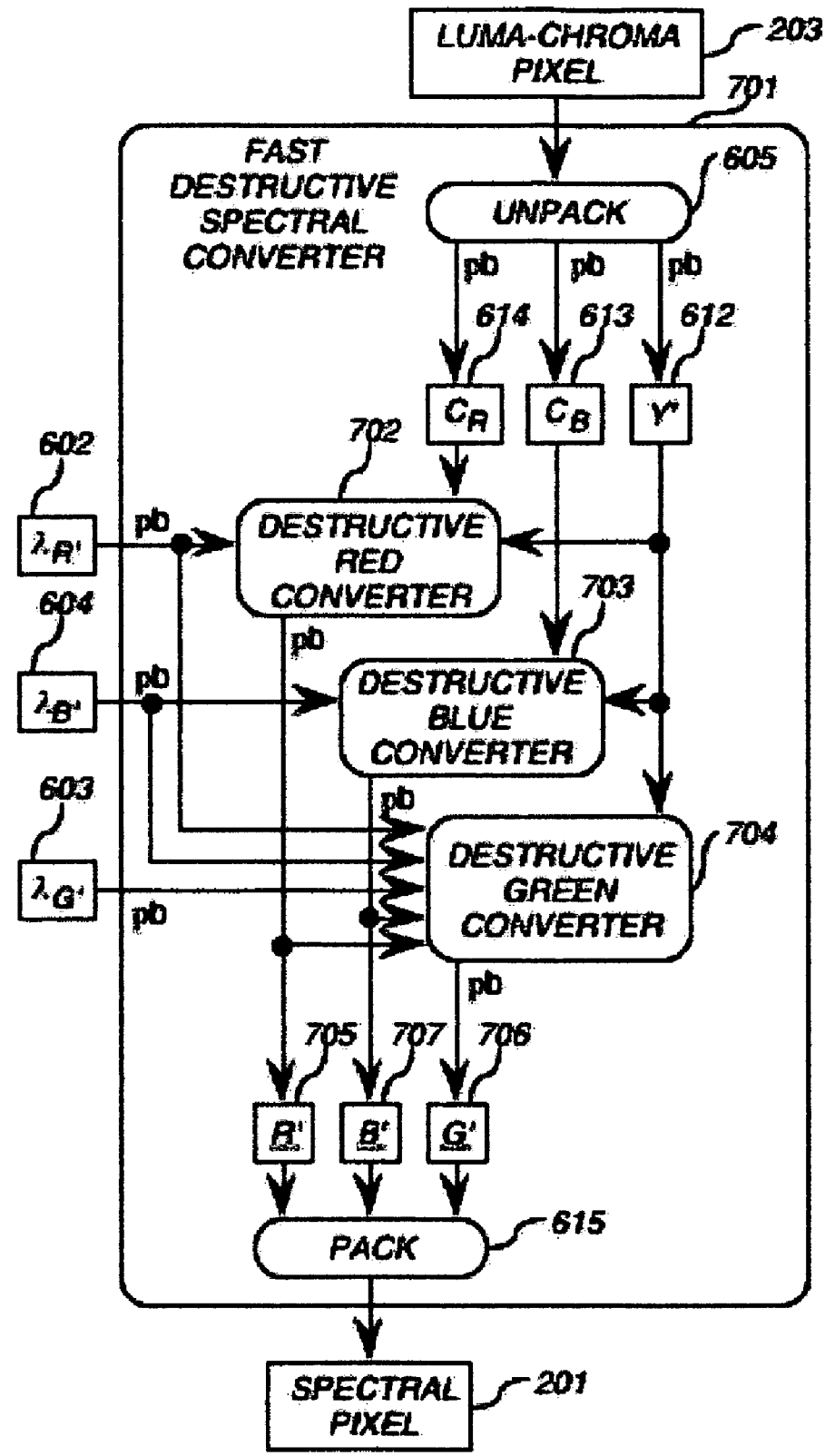
FIG. 7 is an alternate flow diagram of the spectral color converter in FIG. 3, using a fast destructive fixed-point converter for a sequential processor.

A method for color-space conversion of digital image data is described. In the following description, numerous specific details, such as number of dimensions, pixel components, bits per sample, etc., are set forth in order to provide a more thorough understanding of the present invention. It will be apparent to one skilled in the art, however, that the present invention may be practiced without these specific details. In other instances, well-known features have not been described in detail, so as not to unnecessarily obscure the present invention.

In the preferred embodiment of the present invention, source image material consists of large high-precision multichannel images. These images may, for example, be taken by digital video or still cameras, digitized from slides or prints by a scanner, taken by other imaging devices, or be synthesized or edited with the aid of a computer. The source images may have 2 or more spatial dimensions, and may be still or moving images. The images may have multiple channels which may represent color spectral components, false-color components, or other quantitative information. In the case of digital video, the images may, for purposes of example, consist of 720-by-486-pixel images having 24-bit trichrome pixels with 8 bits each for red, green, and blue color components, at a rate of 30 frames per second, as appropriate for the NTSC standard. In the case of digital still cameras, to take another example, the images may be tens of thousands of pixels on a side, with 16 bits per color channel. Although the preferred embodiment uses large high-precision images, small, low-precision images can also be used with this invention.

The present invention interconverts images between R'G'B' space and $Y'C_B C_R$ space with no loss or with guaranteed minimal loss, depending on the parameters.

Computer System

The present invention may be implemented as computer software on any conventional or general-purpose computer system capable of processing images, or on a special-purpose image processing device such as a digital camera, scanner, or converter. FIG. 1 illustrates a typical embodiment of a computer system or digital-image processing device for implementing this invention. Digital image processing device 101 features a central processor 102 with attached memory cache 103. Processor 102 communicates with other internal units via bidirectional system communications bus 104. Such other units commonly include video memory 105 with attached display 106 for human viewing of images and other information; image capturer 107 for inputting images directly into the computer; other input and output devices 108 such as keyboard, mouse, digital camera controls, audio input/output, etc; main random-access memory 109; mass storage 110 such as a hard disk; and network interface 111 for communicating with network 112 of other computer systems, including other image-processing devices. Any of these components, including the central processor, can be absent or represented by multiple units of possibly different types.

Implementation of this invention on general-purpose computer systems is preferable whenever the images are synthesized, edited, displayed, or otherwise processed on a general-purpose computer system. However, the present invention requires little in the way of computational resources, so that it can easily be implemented on much simpler and cheaper processors as software, firmware, or hardware in an embedded system such as a video camera, still camera, scanner, printer, storage device controller, transmitter, or receiver, including a peripheral device for a general-purpose computer system.

Reversible Color Conversion

FIG. 2 and FIG. 3 are top-level information-flow diagrams of a luma-chroma converter and a spectral converter, representing either lossy converters of prior art or the lossless converters of the present invention. In FIG. 2, spectral pixel 201 is converted by luma-chroma converter 202 into luma-chroma pixel 203. In FIG. 3, luma-chroma pixel 203 is converted by spectral converter 301 into spectral pixel 201. In an R'G'B'→$Y'C_B C_R$→R'G'B' workflow, source spectral pixels are converted to luma-chroma space, edited or otherwise processed, and then converted back to spectral space. Using traditional color-space converters, pixels unchanged by the intervening editing process will nevertheless usually be altered, so that the spectral pixel output by the spectral converter is not identical to the spectral pixel input to the luma-chroma converter. Using the present invention, in contrast, any pixels untouched by the editing process will be returned unaltered, exactly identical to the original source pixels, and pixels changed by the editing process will always be mapped to the closest possible spectral pixel. Similarly, in a $Y'C_B C_R$→R'G'B'→$Y'C_B C_R$ workflow, source luma-chroma pixels left alone by the intermediate editing process are nonetheless often changed by traditional color-conversion systems, whereas using the present invention they are reconstructed exactly.

FIG. 4 and FIG. 5 depict the most common luma-chroma and spectral color converters of prior art, which use a matrix multiply 402 in one direction and its inverse 502 in the other direction. Color converters based on matrix multiplication are inherently destructive, regardless of the precision of the multiplication.

Figure 8:
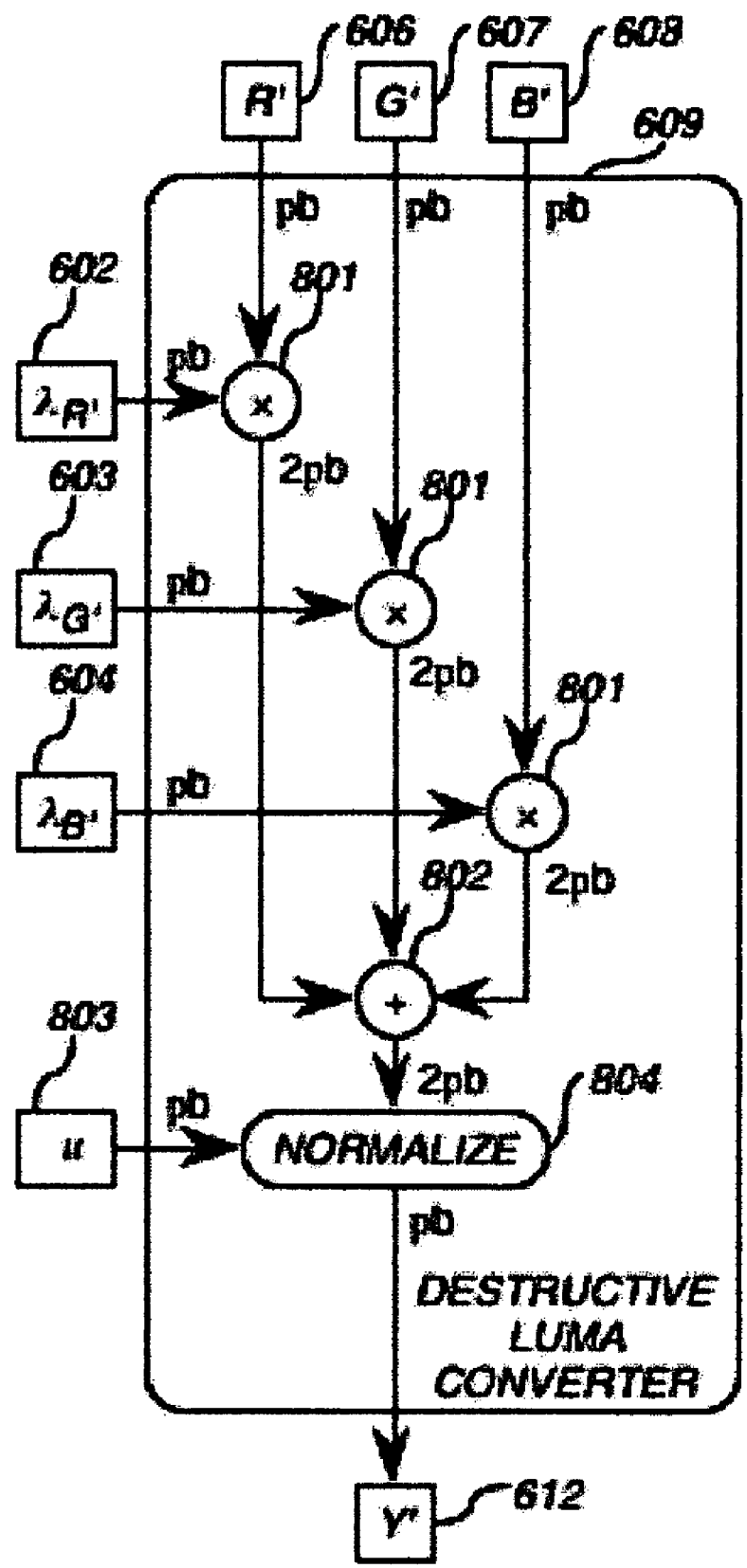
FIG. 8 is an information flow diagram of the destructive luma converter in FIG. 6.
Figure 9:
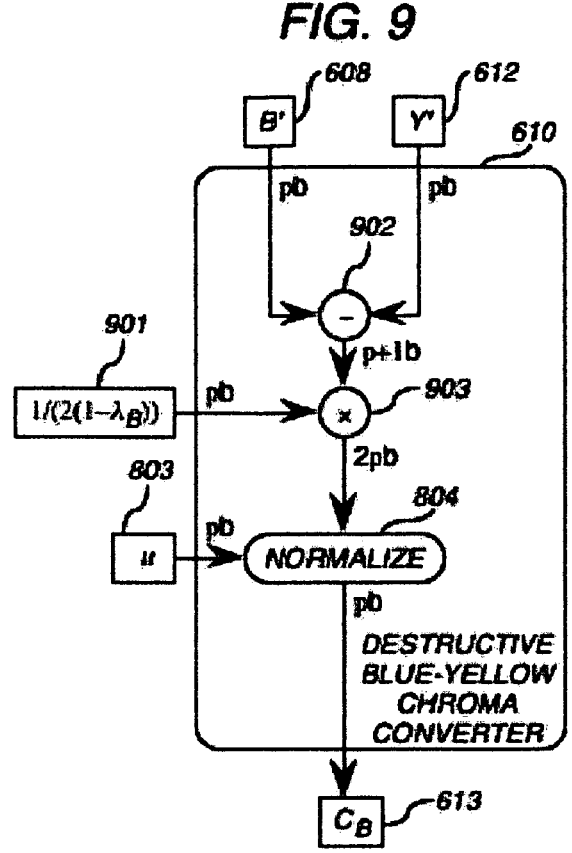
FIG. 9 is an information flow diagram of the destructive blue-yellow chroma converter in FIG. 6.
Figure 10:
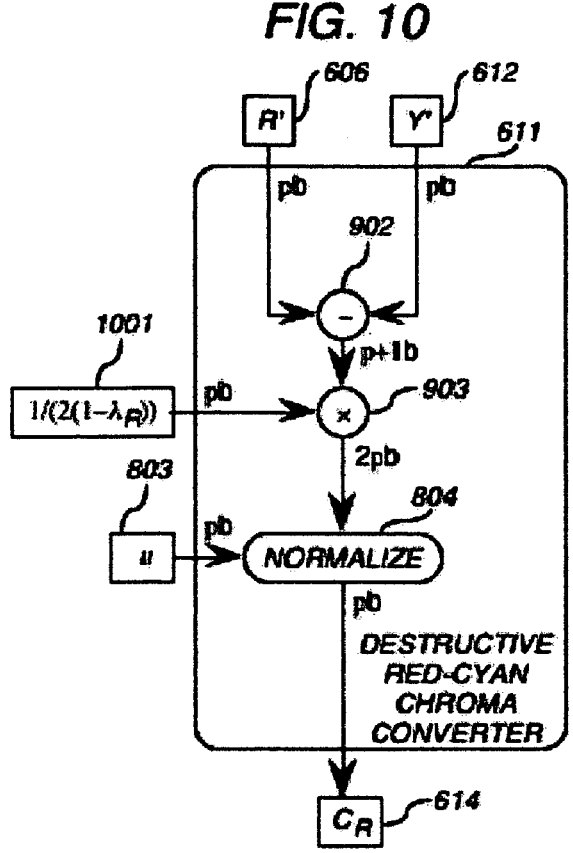
FIG. 10 is an information flow diagram of the destructive red-cyan chroma converter in FIG. 6.
Figure 11:
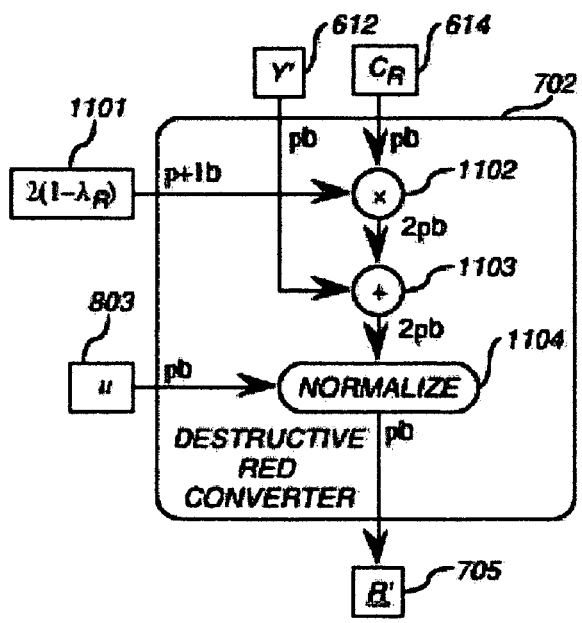
FIG. 11 is an information flow diagram of the destructive red converter in FIG. 7.
Figure 12:
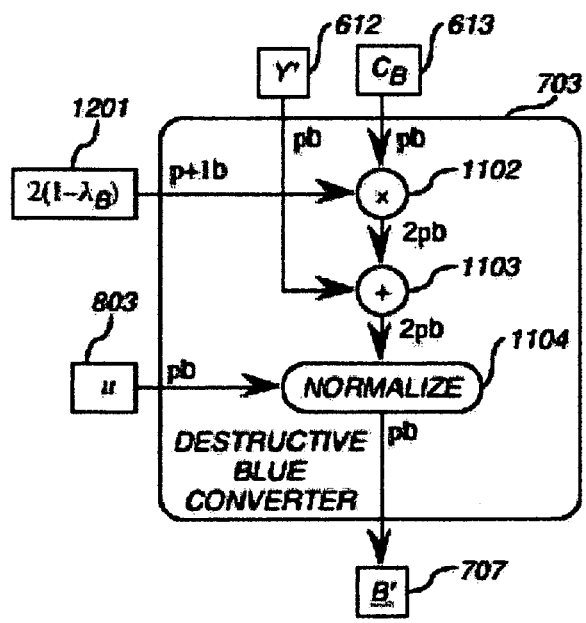
FIG. 12 is an information flow diagram of the destructive blue converter in FIG. 7.
Figure 13:
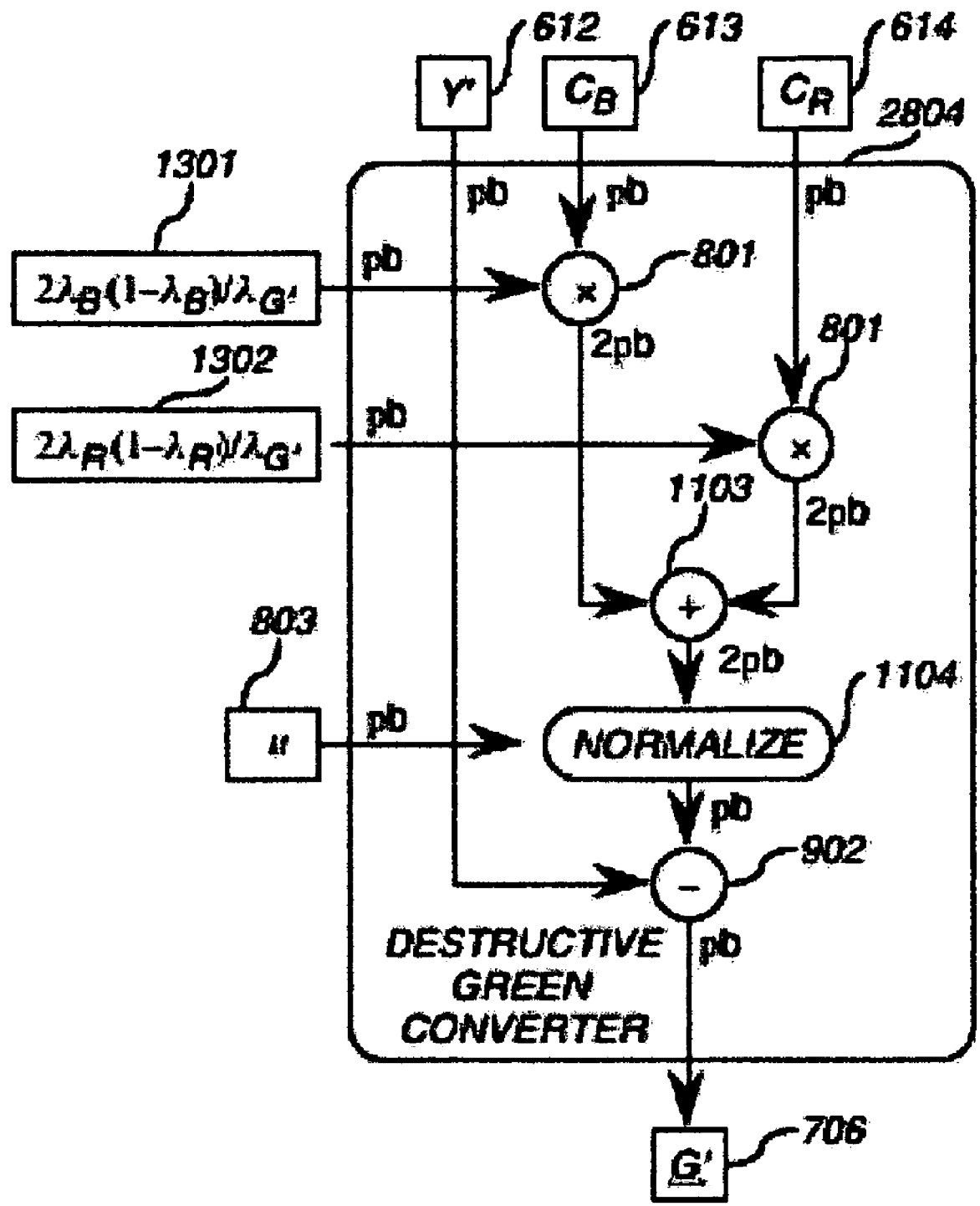
FIG. 13 is an information flow diagram of the destructive green converter in FIG. 7.

FIG. 6 and FIG. 7 show fast color converters typical of prior art designed for implementation on a sequential processor. The details for individual color components of the fast luma-chroma converter in FIG. 6 are given in FIGS. 8, 9, and 10, and those for the fast spectral converter in FIG. 7 are given in FIGS. 11, 12, and 13.

Figure 14:
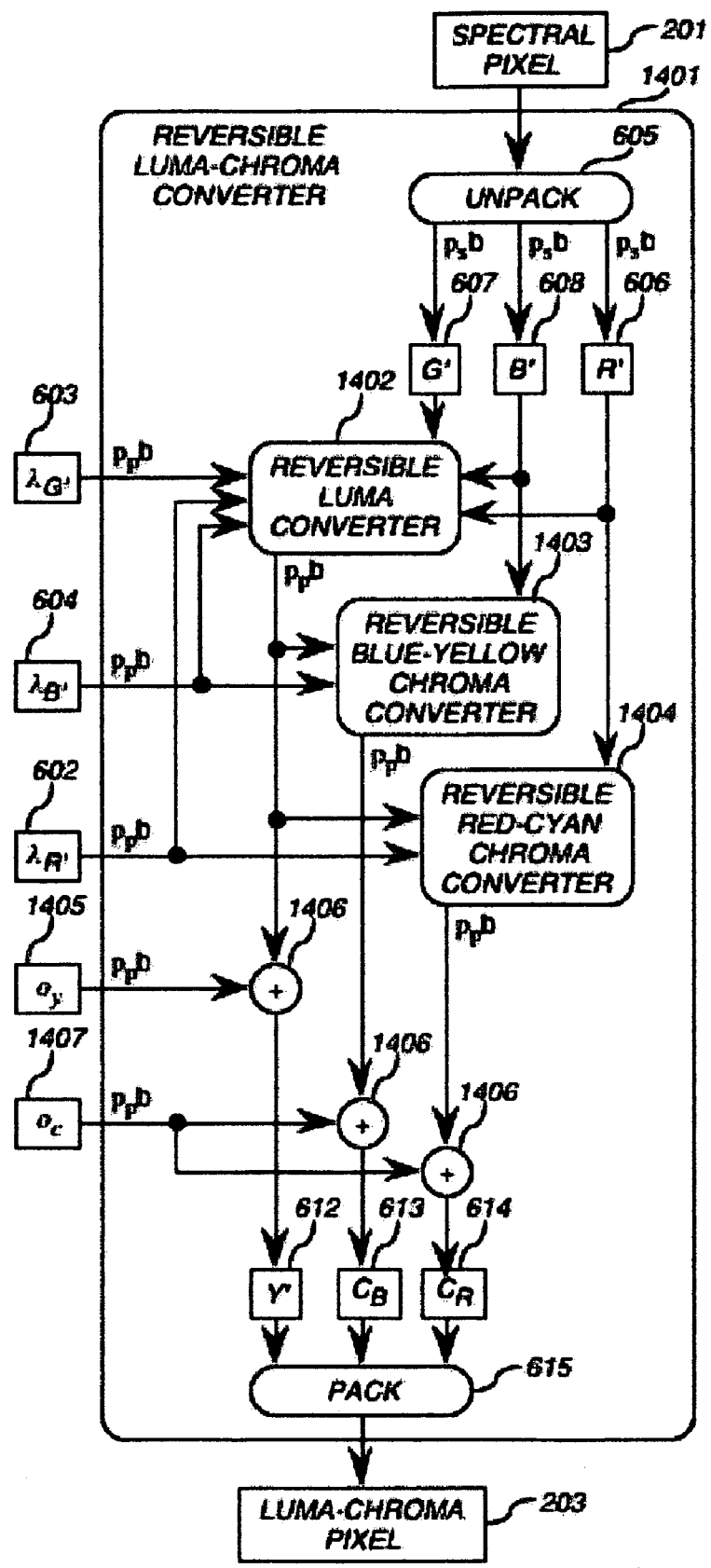
FIG. 14 is an information flow diagram of the reversible luma-chroma converter used in the present invention.
Figure 15:
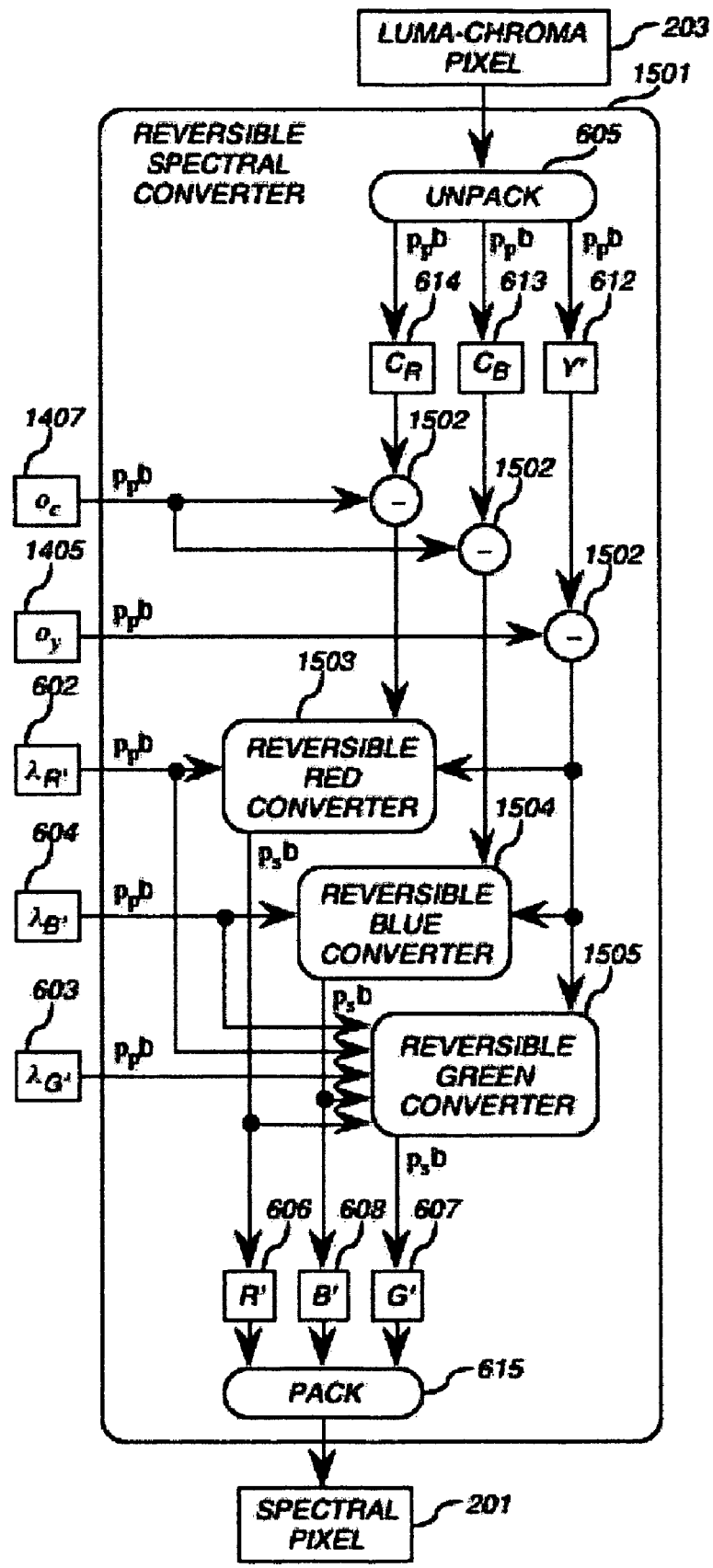
FIG. 15 is an information flow diagram of the reversible spectral converter used in the present invention.

FIG. 14 and FIG. 15 are information-flow diagrams of the reversible luma-chroma and spectral color converters of the present invention. In FIG. 14, spectral pixel 201 is unpacked in step 605 into spectral components R' 606, G' 607, and B' 608, of precision $p_s$ bits, which are then input to reversible luma converter 1402, reversible blue-yellow chroma converter 1403, and reversible red-cyan chroma converter 1404, the outputs of which are offset by luma offset $o_y$ 1405 and chroma offset $o_c$ 1407 in step 1406 to yield perceptual pixel components Y' 612, $C_B$ 613, and $C_R$ 614, of precision $p_p$ bits, which in turn are packed by step 615 into Y'$C_B C_R$ perceptual pixel 203. In the reverse direction, depicted in FIG. 15, luma-chroma pixel 203 is unpacked into perceptual components Y' 612, $C_B$ 613, and $C_R$ 614, of precision $p_p$ bits, which are deoffset by luma offset $o_y$ 1405 and chroma offset $o_c$ 1407 in step 1502, and then input to reversible red converter 1503, reversible blue converter 1504, and reversible green converter 1505, yielding spectral pixel components R' 606, G' 607, and B' 608, of precision $p_s$ bits, which are then packed in step 615 into spectral pixel 201.

Figure 16:
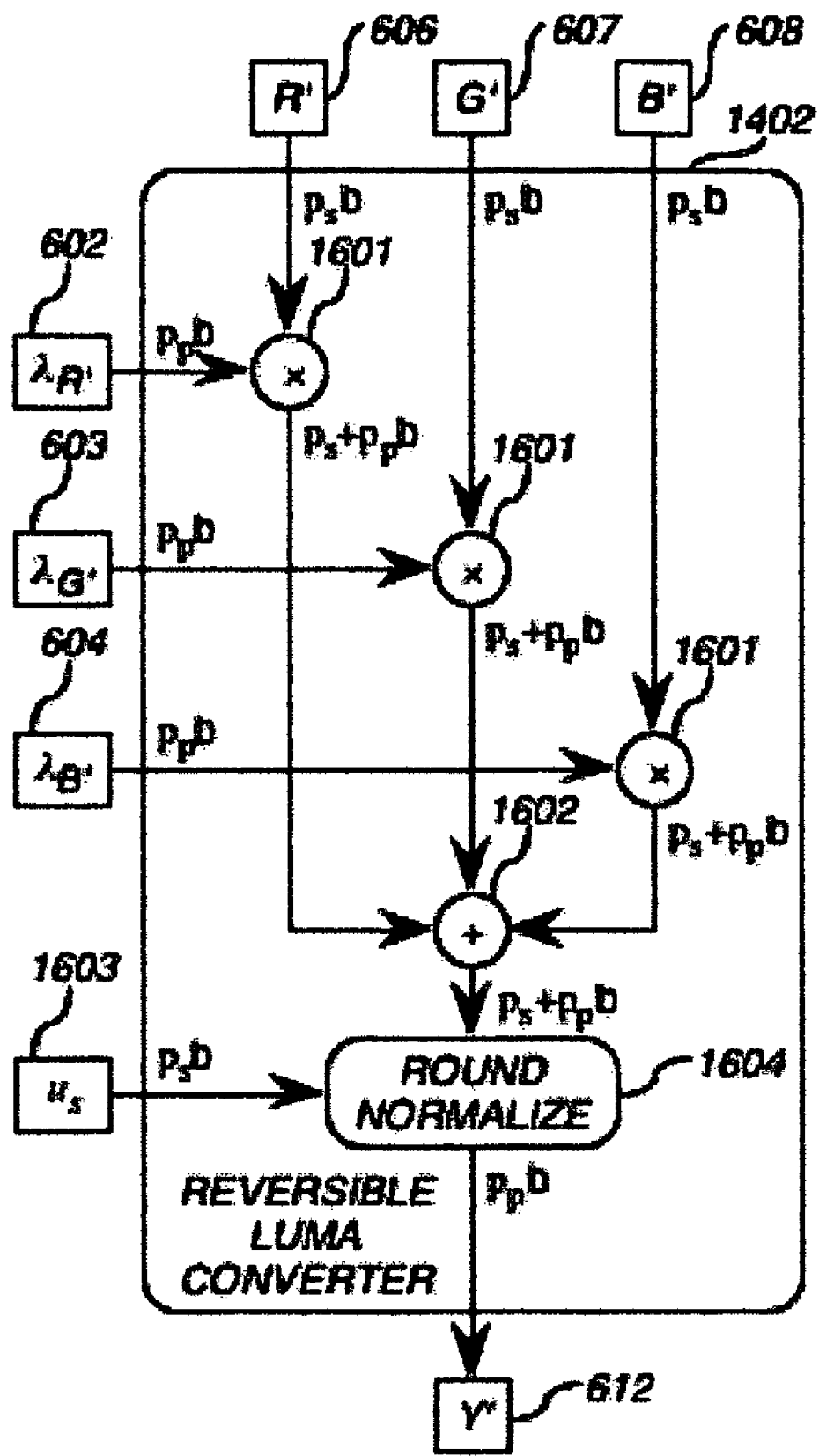
FIG. 16 is an information flow diagram of the reversible luma converter step in FIG. 14.

FIG. 16, FIG. 17, and FIG. 18 are information-flow diagrams of the reversible luma converter, reversible blue-yellow chroma converter, and red-cyan chroma converter in the reversible luma-chroma converter in FIG. 14 used in the present invention. In FIG. 16, $p_s$-bit spectral pixel components R' 606, G' 607, and B' 608 are scaled by $p_p$-bit luma coefficients $\lambda_R$ 602, $\lambda_G$ 603, and $\lambda_B$ 604, respectively, using integer multipliers 1601, yielding luma components of precision $p_s+p_p$ bits, which are then summed by integer adder 1602 and normalized by the spectral component unit $u_s$ using rounding normalizer 1604 to yield $p_b$-bit luma component Y' 612. The luma coefficients are dependent on the chromaticities of the spectral and luma-chroma color spaces, as explained previously in the background section. In FIG. 17, $p_s$-bit blue component B' 608 is first multiplied by $p_p$-bit luma unit $u_y$ 1701 using integer multiplier 1601 and then divided by $p_s$-bit spectral-component unit $u_s$ 1603 using rounding normalizer 1604 to yield a $p_p$-bit scaled blue component from which $p_p$-bit luma component Y' 612 is then subtracted using integer subtracter 1502. This $p_p$+1-bit difference is then scaled by chroma unit $u_c$ 1702 using integer multiplier 1601 to yield a 2$p_p$+1-bit result which is then renormalized by the $p_p$+1-bit complement of the blue luma coefficient, $u_y-\lambda_B$ 1703, to yield $p_p$-bit blue-yellow chroma component $C_B$ 613. Analogously, in FIG. 18, $p_s$-bit red component R' 606 is first multiplied by $p_p$-bit luma unit $u_y$ 1701 using integer multiplier 1601 and then divided by $p_s$-bit spectral-component unit $u_s$ 1603 using rounding normalizer 1604 to yield a $p_p$-bit scaled blue component from which $p_p$-bit luma component Y' 612 is then subtracted using integer subtracter 1502. This $p_p$+1-bit difference is then multiplied by chroma unit $u_c$ 1702 using integer multiplier 1601 to yield a 2$p_p$+1-bit result which is then renormalized by the $p_p$+1-bit complement of the red luma coefficient, $u_y-\lambda_R$ 1801, to yield $p_p$-bit red-cyan chroma component $C_R$ 614.

Figure 21:
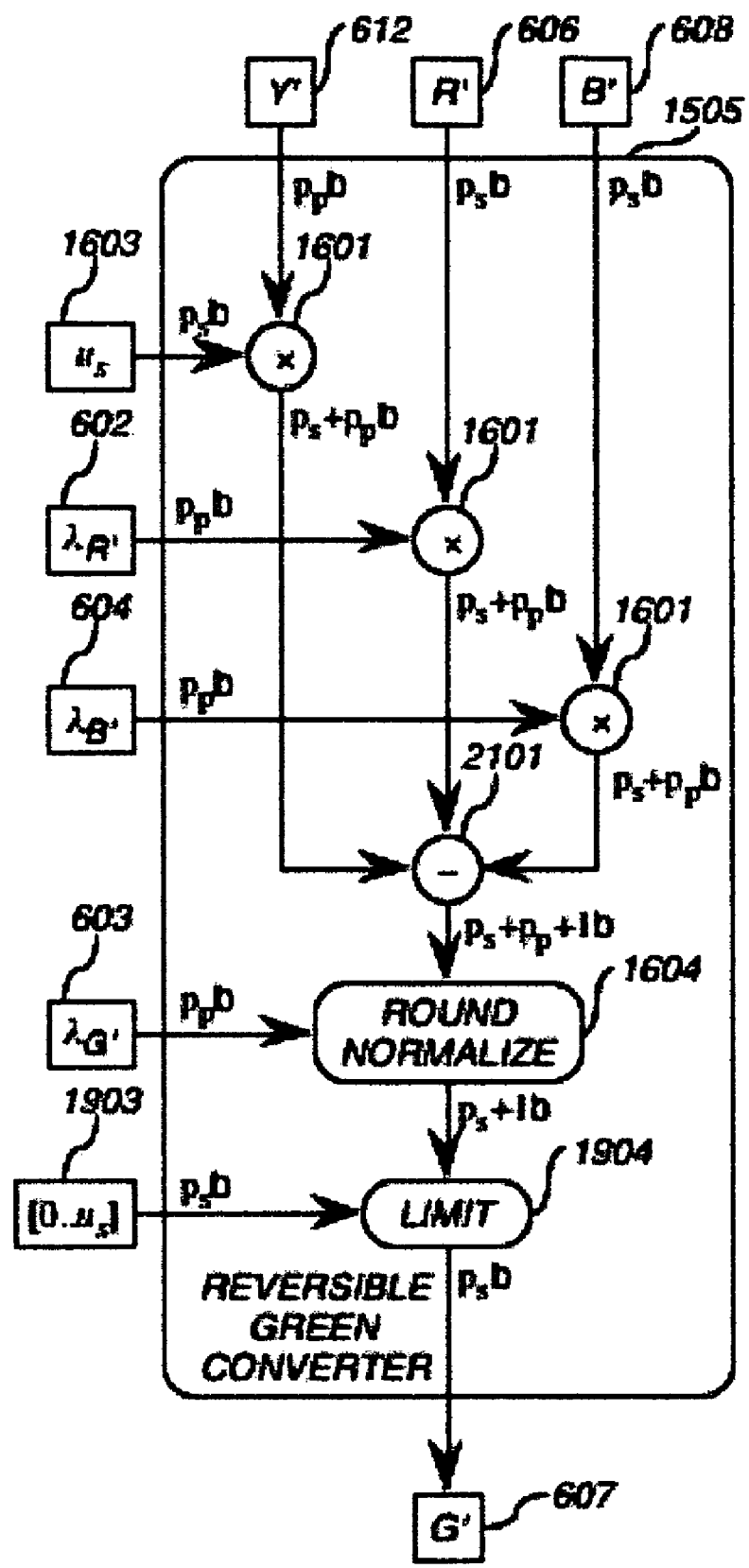
FIG. 21 is an information flow diagram of the reversible green converter step of FIG. 15.

FIG. 19, FIG. 20, and FIG. 21 are information-flow diagrams of the reversible red converter, reversible blue converter, and reversible green converter in FIG. 15 used in the present invention. In FIG. 19, $p_p$-bit red-cyan chroma component $C_R$ 614 is multiplied by the $p_p$+1-bit complement of the red luma coefficient, $u_y-\lambda_R$ 1801 using integer multiplier 1601, and the resulting 2$p_p$+1-bit value added to the 2$p_p$-bit product of $p_p$-bit luma component Y' 612 and $p_p$-bit chroma unit $u_c$ 1702 with integer adder 1902. This 2$p_p$+1-bit sum is scaled by $p_s$-bit spectral unit $u_s$ 1603, and divided by the product of the luma coefficient and the chroma coefficient $u_y u_c$ 1901 using rounding normalizer 1604, whereupon the $p_s$+1-bit normalized red value is limited to the spectral component range [0 ... $u_s$] 1903 using integer limiter 1904 to yield $p_s$-bit red component R' 606. Likewise, in FIG. 20, $p_p$-bit blue-yellow chroma component $C_B$ 613 is multiplied by the $p_p$+1-bit complement of the blue luma coefficient, $u_y-\lambda_B$ 1703 using integer multiplier 1601, and the resulting 2$p_p$+1-bit value added to the 2$p_p$-bit product of $p_p$-bit luma component Y' 612 and $p_p$-bit chroma unit $u_c$ 1702 with integer adder 1902. This 2$p_p$+1-bit sum is scaled by $p_s$-bit spectral unit $u_s$ 1603, and divided by the product of the luma coefficient and the chroma coefficient $u_y u_c$ 1901 using rounding normalizer 1604, whereupon the $p_s$+1-bit normalized blue value is limited to the R'G'B' component range [0 ... $u_s$] 1903 using integer limiter 1904 to yield $p_s$-bit blue component B' 608. As illustrated in FIG. 21, once the $p_s$-bit red and blue components R' 606 and B' 608 are available, they are multiplied by the $p_p$-bit red and blue luma coefficients $\lambda_R$ 602 and $\lambda_B$ 604, respectively, using integer multipliers 1601. These $p_s+p_p$-bit products are subtracted from the $p_s+p_p$-bit scaled luma coefficient obtained by scaling $p_p$-bit luma coefficient Y' 612 with $p_s$-bit spectral unit $u_s$ 1603 using integer multiplier 1601, yielding a $p_s+p_p$+1-bit difference which is divided by $p_p$-bit green luma coefficient $\lambda_G$ 603 using rounding normalizer 1604, whereupon the $p_s$+1-bit normalized green value is limited to the spectral component range [0 ... $u_s$] 1903 using integer limiter 1904 to yield $p_s$-bit green component G' 607.

FIG. 22 and FIG. 23 are information-flow diagrams of the unsigned rounding normalizer 1604 and signed rounding normalizer 1704 used in the component converters in FIG. 16 ... 21. In the simpler unsigned rounding normalizer depicted in FIG. 22, unsigned $p_x+p_y$-bit value×2201 is incremented by half the norm $u_x/2$ 2202 using integer adder 2203 for rounding, and divided by the norm $u_x$ 2204 using integer divider 2205 to yield $p_y$-bit rounded normalized value Y 2206. In the signed rounding normalizer illustrated in FIG. 23, depending on whether signed $p_x+p_y$-bit value X 2201 is positive or negative, as determined by integer signum function 2301, the half-norm $u_x/2$ 2202 is either added to or subtracted from it, using integer subtracter 2302 or adder 2203, respectively, for signed rounding, and divided by the norm $u_x$ 2204 using integer divider 2205 to yield $p_y$-bit rounded normalized value Y 2206. The signed rounding normalizer is necessary when the domain extends below zero, and ensures that the truncation of the fraction occurring during integer two's-complement division results in rounding toward zero, rather than toward negative. An alternative (not shown) would be to use sign+magnitude representation.

FIG. 24 is an information-flow diagram of the integer limiter 1904 used in the spectral component converters in FIG. 19 ... 21. As shown in this figure, $p_x$-bit value X 2401 is compared to $p_y$-bit minimum value α 2402 using integer comparator 2403. If X is less than (or equal to) α, then the limiter outputs the minimum value α 2402. Otherwise, the input value is compared to $p_y$-bit maximum value b 2404. If X is greater than (or equal to) b, then the limiter outputs maximum value b 2404. Otherwise, the limiter outputs the input value X, reduced to $p_y$-bit precision.

Numerous minor variations on the color conversion system illustrated in these figures are possible while maintaining its nondestructive character, as will be obvious to those skilled in the art. For example, with proper scaling of the limits 1903, the order of the rounding normalization 1604 and limiting 1904 steps in the spectral component converters in FIG. 19 ... 21 can be reversed, at the cost of a higher precision requirement in the limiter. As another example, with appropriate scaling of the luma coefficient 612 and multiplication of the norms 1603 and 1703 or 1801, the first normalization step 1604 in the chroma converters in FIG. 17 and FIG. 18 can be subsumed in the second normalization step 1704, at the cost of a higher precision requirement in the latter. As yet another example, instead of applying the luma and chroma offsets $o_y$ 1405 and $o_c$ 1407 as shown in FIG. 14 and FIG. 15, they can be applied within the component converters, with appropriate compensation of other values. Furthermore, any step or combination of adjacent steps in these diagrams can be replaced by a table lookup.

For all the standards listed in the background section, a luma-chroma precision $p_p$ 2 or more bits greater than the spectral precision $p_s$ suffices to make the reversible color converter perfectly lossless in an R'G'B'→Y'$C_B C_R$→R'G'B' workflow. In a Y'$C_B C_R$→R'G'B' Y'$C_B C_R$ workflow, the spectral precision $p_s$ must be one ore more bits greater than the luma-chroma precision of $p_p$ bits to guarantee perfect reversibility. For example, with the present invention, if source data in 8-bit R'G'B' format with spectral unit $u_s$=255 is converted to 10-bit Y'$C_B C_R$ 4:4:4 pixel format compliant with Recommendation ITU-R BT.601-4—where the luma unit $u_y$=876, chroma unit $u_c$=448, luma offset $o_y$=64, and chroma offset $o_c$=512, the red and blue luma coefficients $\lambda_R$ and $\lambda_B$ are scaled by luma unit $u_y$, and the green luma coefficient $\lambda_G$ is chosen as the complement of the red and blue luma coefficients with respect to the luma unit—and if the Y'$C_B C_R$ 4:4:4 data is then converted back to 8-bit R'G'B' pixel format, the output R'G'B' pixels will be bit-for-bit identical to the input R'G'B' pixels. Likewise, if 8-bit R.601-4-compliant Y'$C_B C_R$ 4:4:4 source data (with $u_y$=219, $u_c$=112, $o_y$=16, $o_c$=128) is converted to 9-bit R'G'B' pixel format (with $u_s$=511) and back to Y'$C_B C_R$ 4:4:4 pixel format, the output Y'$C_B C_R$ pixels will be bit-for-bit identical to the input Y'$C_B C_R$ pixels, excluding, of course, any Y'$C_B C_R$ pixels which are outside the R'G'B' gamut. And in the absence of precision augmentation in the intermediate color space, with both pixel formats using the same precision, the present invention yields the minimum theoretically possible error.

The embodiments of the invention in which an exclusive property or privilege is claimed are defined as follows:

1. A method of converting digital image data from a first format wherein colors are represented in a first color space to a second format wherein colors are represented in a second color space distinct from the first color space, the method comprising:

converting a first representation of the digital image data from the first color space to a second representation of the digital image data in the second color space;

converting the second representation of the digital image data from the second color space to a third representation of the digital image data in the first color space;

producing intermediate image data values, wherein a range of the values is centered about zero;

rounding the intermediate image data values, wherein rounding depends on a sign of an intermediate image data value, such that negative intermediate image data values are rounded upward and positive intermediate image data values are rounded downward; and normalizing the intermediate image data values.

2. The method of claim 1, wherein the steps of converting comprise using fixed-point multiplication and addition, wherein a conversion error, being any difference between the first representation of the digital image data and the third representation of the digital image data, is minimized.

3. The method of claim 2, wherein the steps of converting further comprise augmenting precision of the second representation of the digital image data in the second color space, whereby the augmenting of precision in the second representation reduces the conversion error to zero.

4. The method of claim 1, wherein the steps of converting comprise factoring a transform of digital image data into sequential steps, whereby the factoring reduces precision of the intermediate image data values and reduces an amount of computation.

5. The method of claim 4, wherein the steps of converting further comprise omitting any multiplications by one and zero, whereby the amount of computation is further reduced by the omissions.

6. The method of claim 4, wherein the step of converting the first representation of the digital image data further comprises a plurality of rounding and normalizing steps in a plurality of chroma converters, whereby the precision of intermediate image data values is further reduced.

* * * * *

UNITED STATES PATENT AND TRADEMARK OFFICE
CERTIFICATE OF CORRECTION

PATENT NO. : 7,659,911 B2
APPLICATION NO. : 11/112274
DATED : February 9, 2010
INVENTOR(S) : Andreas Wittenstein It is certified that error appears in the above-identified patent and that said Letters Patent is hereby corrected as shown below:

On the Title page of the Letters Patent after Prior Publication Date, please insert:

"Related U.S. Application Data" section:
    Please insert -- Provisional application No. 60/564,136, filed on April 21, 2004. --

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,659,911 B2 |
| APPLICATION NO. | : 11/112274 |
| DATED | : February 9, 2010 |
| INVENTOR(S) | : Andreas Wittenstein |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this

Thirtieth Day of November, 2010

David J. Kappos
*Director of the United States Patent and Trademark Office*